United States Patent [19]

Kim

[11] Patent Number: 5,201,493
[45] Date of Patent: Apr. 13, 1993

[54] ELECTRICALLY INSULATED BALL VALVE DEVICE

[76] Inventor: Young M. Kim, Yoowon Apt. 4-802, Bub-Dong, Daeduk-ku, Daejeon City, Rep. of Korea

[21] Appl. No.: 894,138

[22] Filed: Jun. 4, 1992

[30] Foreign Application Priority Data

Mar. 12, 1992 [KR] Rep. of Korea ............ 92-4012
May 15, 1992 [KR] Rep. of Korea ............ 92-8333

[51] Int. Cl.⁵ .................................. F16K 5/06
[52] U.S. Cl. ............................ 251/315; 137/560
[58] Field of Search .......... 251/315; 137/560, 375

[56] References Cited

U.S. PATENT DOCUMENTS 3,635,439  1/1972  McNally .................. 251/315
4,023,773  5/1977  Wise ..................... 251/315 X
4,076,211  2/1978  Krechel et al. ........... 251/315 X

FOREIGN PATENT DOCUMENTS 3214918  11/1983  Fed. Rep. of Germany ...... 137/560

Primary Examiner—John C. Fox
Attorney, Agent, or Firm—Lowe, Price, LeBlanc & Becker

[57] ABSTRACT

Disclosed is relating to a electrically insulated ball valve device to be interposed between a couple of metallic pipes for supplying fluid so as to electrically insulating the couple of metallic pipes each other. The device includes a valve body having threaded portion formed at its both end, a valve cap having threaded portions one of which is coupled to one of the threads of the valve body and an insulating layer formed onto any one of said threads thereby electrically insulating the couple of metallic pipes each other without a separate insulating device.

10 Claims, 2 Drawing Sheets

ELECTRICALLY INSULATED BALL VALVE DEVICE

BACKGROUND OF THE INVENTION

The present invention relates to a ball valve device to be interposed between a couple of metallic pipes for supplying a fluid, more particularly to a ball valve device capable of cutting off the current which flows through the couple of metallic pipes coupled with both sides of the ball valve.

Liquefied Natural Gas (LNG) is universally used as fuel for cooking, heating and so on. The LNG is generally provided from a large-scale source of supply to each of users through metallic pipes. Since such pipes are electrically conductive, pipes are corroded due to several kinds of current such as earthing current by consumer goods, leakage current, static electricity and so on. Such corrosions shortenize the life of pipe and are able to cause a big accident by the leaked LNG due to the corrosions. Accordingly, one of important things in supplying LNG is to cut off the current flowing through pipes. A conductive pipe for supplying an nonconductive fluid is always raised a problem on such an electric corrosion.

In order to cut off such current flowing through the pipe, it has been known that a flange coupling including an insulating sheet and insulating spacers is interposed between pipes only for the purpose of insulating. However, this type of conventional way has a drawback in that additional costs and efforts are required for the purpose of insulating because of interposing the flange coupling additionally, and has further disadvantage in that an enough insulating effect is not guaranteed for a long time because of deteriorating the function of the insulating element such as the insulating sheet or the insulating spacers of the flange coupling due to a twisting appearance of the pipe derived from the ground subsidence.

SUMMARY OF THE INVENTION

Accordingly, a principal object of the present invention is to provide an improved ball valve device, which is generally used to a pipe for supplying fluid, capable of electrically insulating the device, thereby cutting off the current to be flowed along the pipe without using an additional insulating utensil.

According to the present invention, the ball valve device comprises a valve body, rotatablely accomodating said ball therein, including first threaded portion formed at its one end for coupling a first pipe, second threaded portion formed at the other end and a first ball seat for supporting one side of said ball, a valve cap including third threaded portion at its one end for engaging with said second threaded portion, fourth threaded portion formed at the other end for coupling a second pipe and a second ball seat for supporting the other side of said ball, and an insulating layer, formed onto at least one of said first, second, third and fourth threaded portion, for electrically insulating the first and second pipes each other.

Other features and operations of the present invention will become apparent from the following detailed description of the invention when taken in conjunction with the accompanying drawings.

DETAILED DESCRIPTION OF THE INVENTION

Figure 1:
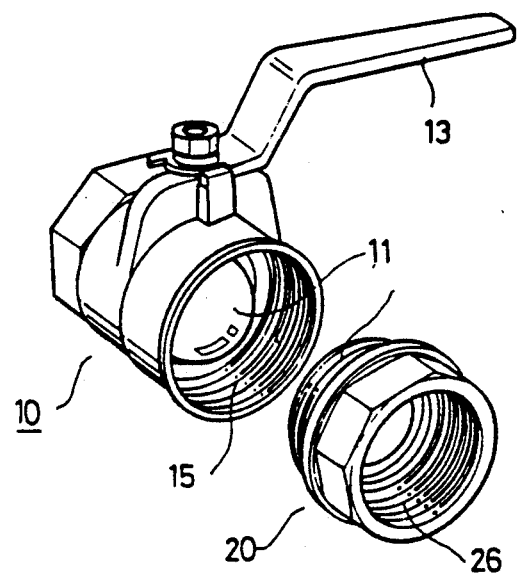
FIG. 1 is a disassembled perspective view of the electrically insulated ball valve device according to the present invention.
Figure 2:
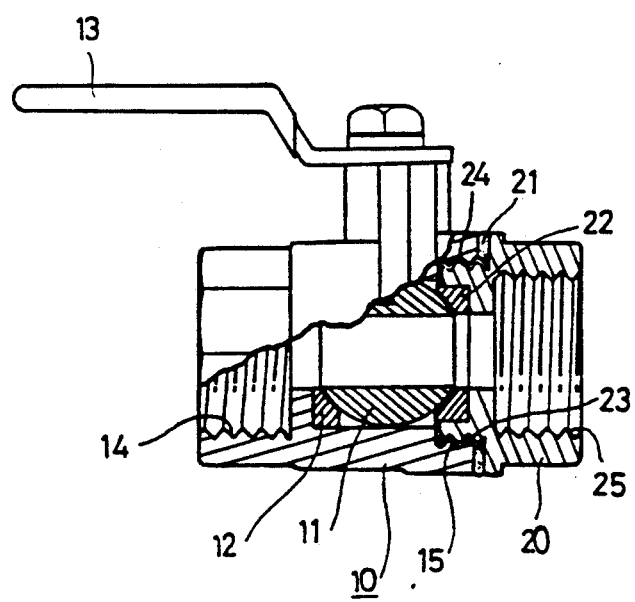
FIG. 2 is a partially cutaway cross-sectional view of the present invention.

Referring to FIGS. 1 and 2, the ball valve device of the present invention comprises a ball 11 formed of a penetrating hole for controlling a fluid flow, a valve body 10 rotatablely accommodating ball 11 therein and providing a path of flowing fluid from one side to the other side through the penetrating hole of the ball 11 and a valve cap 20 to be spirally coupled to one side of valve body 10. Valve body 10 is formed with female thread 14 and 15 with its both sides each of which is coupled with a pipe (not shown) or one side of valve cap 20. Valve cap 20 is formed of a male thread 23 with its one side to be coupled with one of female thread 14 and 15 of valve body 10 and a female thread 26 with its other side for coupling a pipe. The ball valve device also has an electrically insulated layer 24 surrounding male thread 23 of valve cap 20 and an O-ring 2 for hermetically coupling valve body 10 and valve cap 20.

Ball 11 is rotatablely held in valve body 10 in such a manner that the surface thereof is contacting with a first ball seat 12 formed at a inner side of valve body 10 and a second ball seat 22 formed at one end and inner portion of valve cap 20. Ball 11 is moved between two positions of which one position is the openning position for permitting the fluid flow by lining up the penetrating hole of ball 11 with pipes coupled to both sides of the ball valve device and the other position is the closing position for shutting the fluid flow off, by mannually operating an operating lever 13. Ball seats 12 and 22 are made of a plastic material, for example "teflon", having the magnetic lubrication properties, thereby providing the electric insulation between ball 11 and valve body 10 o valve cap 20.

Figure 3:
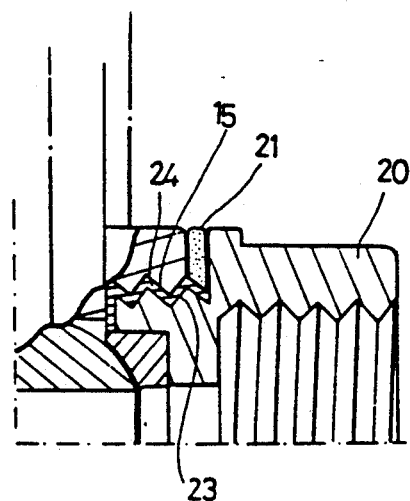
FIG. 3 is an enlarged view of part A in FIG. 2.
Figure 4:
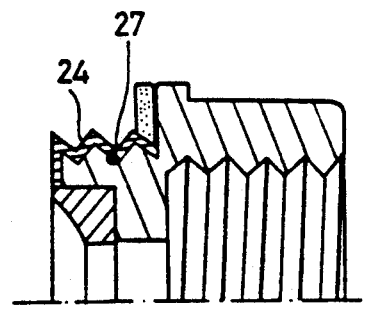
FIG. 4 is a cross-sectional view of a part corresponding to part A in FIG. 2 in order to illustrate another embodiment of the electrically insulated ball valve device according to the present invention.

FIG. 3 is an enlarged view of part A in FIG. 2. As can be seen from FIG. 3, an electric insulating layer 24 is formed in such a manner that it surrounds male thread 23 of valve cap 20 in order to provide the electric insulation between valve body 10 and valve cap 20. The electric insulating layer 24 can be formed by an insert injection performing process using materials of the glass fiber reinforced plastics or the engineering plastics so as to guarantee an enough degree of coupling strength. In some cases, after forming the electric insulating layer 24 by an injection process, the electric insulating layer can be hermetically assembled onto the thread of the valve cap 20. Furthermore, in order to prevent the fluid leakage due to the difference of the heat expanding coefficients between the insulating layer 24 and the valve cap 20, an O-ring 27 can be, as described in FIG. 4, interposed between the insulating layer 24 and the male thread of valve cap 20.

In order to prevent the possibility of occuring arc between valve body 10 and valve cap 20, it is preferable to expand electric insulating layer 24 up to ball seat 22 of valve cap 20. Otherwise, ball seat 22 may be integral with electric insulating layer 24.

As described above, all contacting portions between valve body 10 and valve cap 20 are completely insulated. therefore, both fluid supplying pipes of which one is coupled to valve body 10 and the other is coupled to valve cap 20 are electrically insulated each other. The electric insulation between valve body 10 and valve cap 20 may also be guaranteed if ball 11 is formed of electrically insulated materials instead of ball seat 22 formed of electrically insulated materials. It is also understood that whole sufface of valve cap 20 can be formed of electrically insulated materials.

Figure 5:
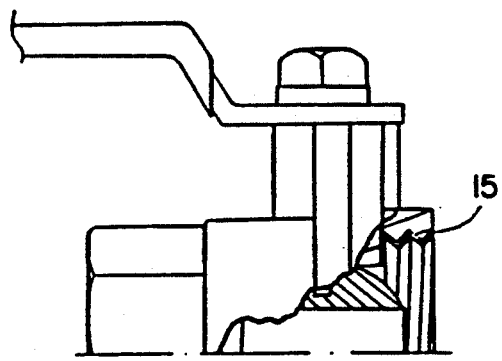
FIG. 5 is a partially cutaway cross-sectional view of the other embodiment of the present invention showing an upper part of a valve body.

FIG. 5 shows another embodiment of the present invention. Although it is convenient in manufacturing a ball valve device that the electric insulating layer is to be formed onto the male thread of valve cap 20, an electric insulating layer can be, as shown in FIG. 5, formed onto one of female threads 14 and 15 formed with both end of valve body 10 and female thread 25 of valve cap 20.

As illustrated above, the present invention need not a separate insulating device and provides an improved ball valve device having an electrically insulating function. While the invention has been illustrated and described with the preferred embodiments, it is recognized that variations and changes can be made without departing from the scope and spirit of the invention as set forth in the claims.

What is claimed is:

1. A ball valve device comprising:
   a ball having a penetration;
   a valve body, rotatably accommodating said ball therein, including a first threaded portion formed at its one end for coupling a first pipe, a second threaded portion formed at the other end and a first ball seat for supporting one side of said ball;
   a valve cap including a third threaded portion at its one end for engaging with said second threaded portion, a fourth threaded portion formed at the other end for coupling a second pipe and a second ball seat for supporting the other side of said ball; and
   an insulating layer, formed on and conforming to at least one of said first, second, third and fourth threaded portions, for electrically insulating the first and second pipes from each other.

2. A ball valve device according to claim 1, wherein at least one of said ball seats is formed of materials having electric insulating properties.

3. A ball valve device according to claim 1, wherein said second threaded portion is negative and said third threaded portion is positive.

4. A ball valve device according to claim 3, wherein said insulating layer is formed onto the third threaded portion.

5. A ball valve device according to claim 4, wherein said insulating layer is extended up to the second ball seat.

6. A ball valve device according to claim 5, wherein said insulating layer is integral with said second ball seat.

7. A ball valve device according to claim 1, wherein said insulating layer is formed by laminating source materials onto the threaded portion.

8. A ball valve device according to claim 1, further comprising hermetically sealing means interposed between the insulating layer and the threaded portion onto which the insulating layer is formed.

9. A ball valve device according to claim 1, wherein said valve cap is formed of electrically insulated materials.

10. A ball valve device according to claim 1, wherein the ball is formed of electrically insulated materials.

* * * * *